United States Patent
Durse et al.

(10) Patent No.: US 11,870,165 B2
(45) Date of Patent: Jan. 9, 2024

(54) FINGER-PROOF BATTERY MODULE BUS BAR CONNECTOR ASSEMBLY

(71) Applicant: Aptiv Technologies Limited, St. Michael (BB)

(72) Inventors: Nicholas A. Durse, Youngstown, OH (US); Adam Wolfgang, Petersburg, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 111 days.

(21) Appl. No.: 16/865,315

(22) Filed: May 2, 2020

(65) Prior Publication Data

US 2020/0403206 A1    Dec. 24, 2020

Related U.S. Application Data

(60) Provisional application No. 62/865,470, filed on Jun. 24, 2019.

(51) Int. Cl.
*H01R 11/09* (2006.01)
*H01B 17/16* (2006.01)
(Continued)

(52) U.S. Cl.
CPC ............. *H01R 11/09* (2013.01); *H01B 17/16* (2013.01); *H01B 17/66* (2013.01);
(Continued)

(58) Field of Classification Search
CPC ...... H01R 11/09; H01R 4/308; H01R 11/288; H01R 11/289; H01R 13/113;
(Continued)

(56) References Cited

U.S. PATENT DOCUMENTS

| 5,576,516 A | 11/1996 | Kameyama et al. |
| 6,276,960 B1 | 8/2001 | Schaefer et al. |

(Continued)

FOREIGN PATENT DOCUMENTS

| CN | 109326913 A | 2/2019 |
| CN | 109873100 A | 6/2019 |

(Continued)

OTHER PUBLICATIONS

English Abstract Translation for DE102010024519, published Dec. 22, 2011.

(Continued)

*Primary Examiner* — Wyatt P McConnell
(74) *Attorney, Agent, or Firm* — Billion & Armitage (57) ABSTRACT

A bus bar assembly includes, among other things, a nonconductive terminal cap that is configured to at least partially surround an electrically conductive terminal. The terminal cap has a perimeter wall that is configured to circumscribe at least a portion of the terminal to provide a gap that is configured to expose the terminal. The terminal cap includes a first attachment feature. The terminal cap also includes a bus bar that has an end that is configured to mechanically and electrically engage the terminal in an assembled condition. The terminal cap further includes a nonconductive shroud that encloses the bus bar. The shroud includes a second attachment feature that is configured to removably engage the first attachment feature in the assembled condition to secure the shroud to the terminal cap.

12 Claims, 10 Drawing Sheets

(51) Int. Cl.
  *H01B 17/66* (2006.01)
  *H01M 50/505* (2021.01)
  *H01M 50/55* (2021.01)
  *H01R 4/30* (2006.01)
  *H01M 10/42* (2006.01)

(52) U.S. Cl.
  CPC ....... *H01M 10/425* (2013.01); *H01M 50/505* (2021.01); *H01M 50/55* (2021.01); *H01M 2220/20* (2013.01); *H01R 4/308* (2013.01)

(58) Field of Classification Search
  CPC ........ H01R 13/506; H01R 4/70; H01B 17/16; H01B 17/66; H01M 10/425; H01M 50/502; H01M 50/543; H01M 50/572; H01M 2220/20; Y02E 60/10
  See application file for complete search history.

(56) References Cited

U.S. PATENT DOCUMENTS

| | | | |
|---|---|---|---|
| 9,054,359 B2 | 6/2015 | Han et al. | |
| 9,350,127 B2 | 5/2016 | Callicoat et al. | |
| 9,437,860 B2 | 9/2016 | Farha | |
| 9,508,464 B2 | 11/2016 | Nakayama | |
| 9,787,020 B2 | 10/2017 | Choi et al. | |
| 9,997,758 B2 | 6/2018 | Kim et al. | |
| 10,003,112 B1* | 6/2018 | Boor | H01M 50/502 |
| 10,256,451 B2 | 4/2019 | Kim | |
| 10,396,405 B2 | 8/2019 | Zhao | |
| 2006/0270277 A1 | 11/2006 | Zhao et al. | |
| 2011/0053404 A1* | 3/2011 | Tsuruta | H01R 13/4365 439/345 |
| 2016/0056514 A1* | 2/2016 | Ahn | H01M 10/6551 429/120 |
| 2018/0205061 A1* | 7/2018 | Zhan | H01R 13/24 |
| 2019/0044271 A1* | 2/2019 | Reedy | H01R 13/44 |

FOREIGN PATENT DOCUMENTS

| | | |
|---|---|---|
| DE | 102010024519 A1 | 12/2011 |
| EP | 0765005 A2 | 3/1997 |
| EP | 0795005 A2 | 3/1997 |
| EP | 3439116 A1 | 2/2019 |
| KR | 100821859 B1 | 4/2008 |

OTHER PUBLICATIONS

English Abstract Translation for KR100821859, published Apr. 5, 2008.
Extended European Search Report, EP Application No. 20181664.2, dated Oct. 7, 2020, 11 pages.
Communication Pursuant to Article 94(3) EPC for European Application No. 20181664.2, dated Mar. 10, 2022, 11 pages.
Non-Final Office Action for Application No. 202010585.6; China National Intellectual Property Administration; dated Sep. 9, 2023.

* cited by examiner

FINGER-PROOF BATTERY MODULE BUS BAR CONNECTOR ASSEMBLY

CROSS-REFERENCE TO RELATED APPLICATION

This application claims the benefit under 35 U.S.C. § 119(e) of U.S. Provisional Patent Application No. 62/865,470 filed on Jun. 24, 2019, the entire disclosure of which is hereby incorporated by reference.

FIELD OF INVENTION

The disclosure relates to a bus bar used to connect battery cells, for example.

BACKGROUND

A battery module has multiple battery cells with terminals that are electrically connected to one another to provide a more powerful battery than the individual cells would otherwise provide. One common type of electrical connection is a cable having terminal rings at opposing ends. Each terminal ring is bolted to one of terminals of one of the cells. Another common type of electrical connection is a bus bar that is bolted to the cells in a similar manner to that of the cable.

The type of battery module used in, for example, automotive applications provides significant electrical energy. It is desirable to design a system for electrically connecting and disconnecting the cells in a manner that is safe for the battery module assembly and/or service technicians.

SUMMARY

In one exemplary embodiment, a bus bar assembly includes, among other things, a nonconductive terminal cap that is configured to at least partially surround an electrically conductive terminal. The terminal cap has a perimeter wall that is configured to circumscribe at least a portion of the terminal to provide a gap that is configured to expose the terminal. The terminal cap includes a first attachment feature. The terminal cap also includes a bus bar that has an end that is configured to mechanically and electrically engage the terminal in an assembled condition. The terminal cap further includes a nonconductive shroud that encloses the bus bar. The shroud includes a second attachment feature that is configured to removably engage the first attachment feature in the assembled condition to secure the shroud to the terminal cap.

In a further embodiment of any of the above, the perimeter wall has a U-shape that is arranged on at least three sides of the terminal. The perimeter wall extends beyond the terminal.

In a further embodiment of any of the above, the terminal cap has a post that receives the terminal and is arranged interiorly of the perimeter wall. The terminal is a male terminal. The gap is provided between the post and the perimeter wall, and the end is a female terminal that is configured to mate with the male terminal.

In a further embodiment of any of the above, the terminal has a perimeter edge that bounds opposing faces of the terminal. The post receives the terminal and surrounds the perimeter edge but leaves at least one of the faces exposed. The perimeter wall extends beyond the post. The perimeter wall and the post cooperate to provide the gap as finger-proof.

In a further embodiment of any of the above, the terminal cap includes a first notch. The shroud includes a second notch. The first and second notches are nested with one another in the assembled condition to enclose the terminal and the end of the bus bar.

In a further embodiment of any of the above, one of the first and second attachment features is a finger. The other of the first and second attachment features is a protrusion. The finger and the protrusion interlock with one another in the assembled condition.

In a further embodiment of any of the above, the shroud includes multiple shroud portions that cooperate with one another to enclose the bus bar.

In a further embodiment of any of the above, the multiple shroud portions include first and second shroud portions that are nested relative to one another in an overlapping relationship.

In a further embodiment of any of the above, the first and second shroud portions engage in a snap-fit relationship in the assembled condition.

In a further embodiment of any of the above, the first shroud portion includes first and second housings that are secured about a portion of the bus bar. The first and second housings are received in an opening in the second shroud portion.

In a further embodiment of any of the above, the bus bar includes a U-shaped portion that is received in the first shroud portion to provide a space between opposing ends of the bus bar. The space is configured to accommodate an obstruction.

In another exemplary embodiment, a battery module includes, among other things, a battery cell that has an electrically conductive terminal. The battery module also includes a nonconductive terminal cap that is configured to at least partially surround the terminal. The terminal cap has a perimeter wall that is configured to circumscribe at least a portion of the terminal to provide a gap that exposes the terminal. The terminal cap includes a first attachment feature. The battery module further includes a bus bar that has an end that mechanically and electrically engages the terminal in an assembled condition. The battery module further includes a nonconductive shroud that encloses the bus bar. The shroud includes a second attachment feature that removably engages the first attachment feature in the assembled condition to secure the shroud to the terminal cap.

In a further embodiment of any of the above, the battery cell is a first battery cell and the terminal is a first terminal. The battery module further includes a second battery cell that has a second terminal. The end is a first end, and the bus bar has a second end that is secured to the second terminal.

In a further embodiment of any of the above, the perimeter wall has a U-shape that is arranged on at least three sides of the terminal. The terminal cap has a post that is arranged interiorly of the perimeter wall. The gap is provided between the post and the perimeter wall. The terminal is a male terminal with a perimeter edge that bounds opposing faces of the terminal. The post receives the terminal and surrounds the perimeter edge but leaves at least one of the faces exposed. The end is a female terminal that mates with the male terminal.

In a further embodiment of any of the above, the perimeter wall extends beyond the post. The post extends beyond the terminal. The perimeter wall and the post cooperate to provide the gap as finger-proof.

In a further embodiment of any of the above, one of the first and second attachment features is a finger. The other of the first and second attachment features is a protrusion. The finger and the protrusion interlock with one another in the assembled condition.

In a further embodiment of any of the above, the shroud includes multiple shroud portions that cooperate with one another to enclose the bus bar. The multiple shroud portions include first and second shroud portions that are nested relative to one another in an overlapping relationship.

In another exemplary embodiment, a method of electrically connecting cells of a battery includes, among other things, step a) providing a nonconductive terminal cap over a conductive battery cell terminal. The terminal cap at least partially surrounds the terminal. The terminal is a male terminal. The terminal cap has a perimeter wall that is configured to circumscribe at least a portion of the terminal. The terminal is arranged in a post that shields the terminal. The perimeter wall and the post cooperate to provide a gap that exposes the terminal. The method also includes step b) providing a bus bar assembly with a bus bar that has an end that provides a female terminal. A nonconductive shroud encloses the bus bar with the end that is exposed through the shroud. The method further includes step c) pushing the end into the gap and into engagement with the terminal. The method further includes step d) mating the shroud to the terminal cap to enclose the end. The mating step is performed simultaneously with the pushing step c).

In a further embodiment of any of the above, the mating step d) includes connecting a first attachment feature on the terminal cap to a second attachment feature on the shroud, The perimeter wall and the post cooperate to provide the gap as finger-proof.

In a further embodiment of any of the above, the bus bar assembly provides step b) which includes nesting a first shroud portion relative to a second shroud portion to enclose the bus bar with the shroud.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
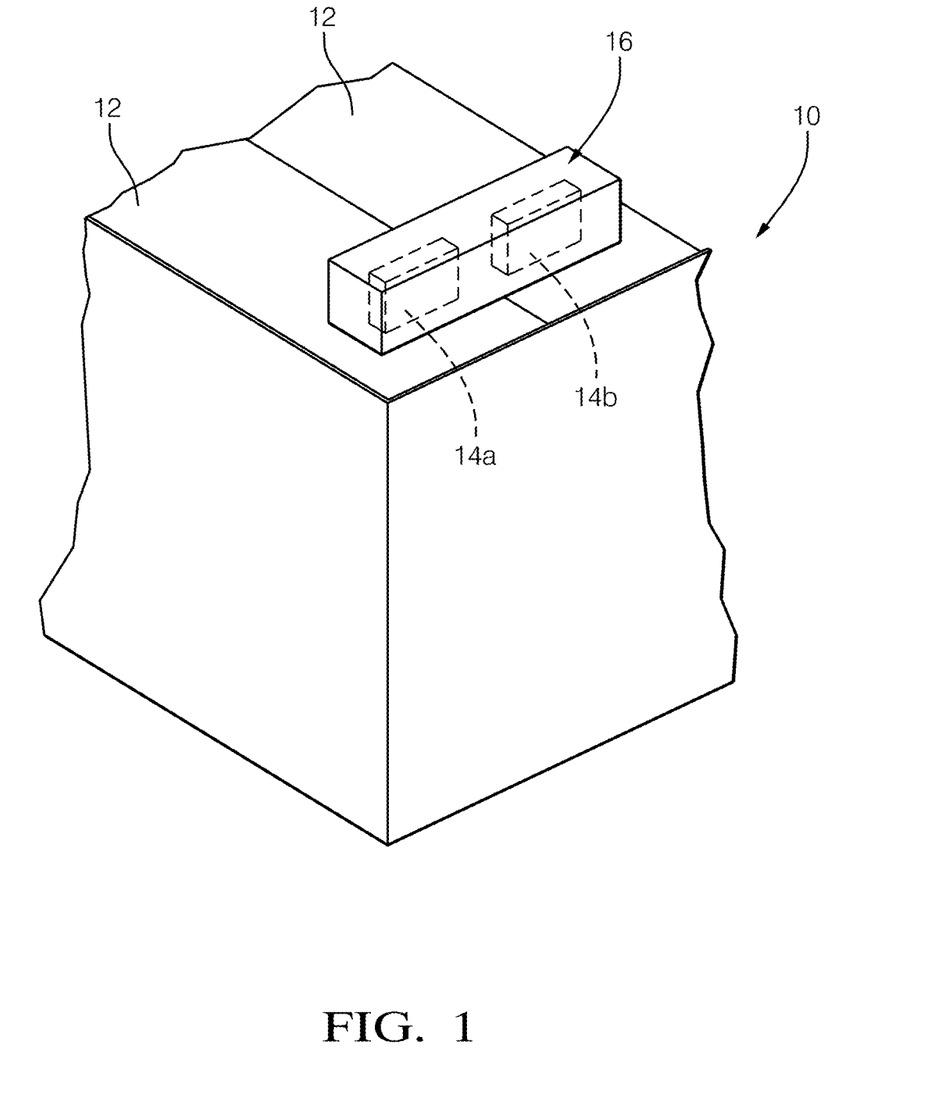
FIG. 1 is schematic of a battery module having multiple battery cells electrically connected to one another with bus bars.

A battery module 10, or battery pack assembly, is schematically illustrated in FIG. 1. The battery module 10 includes multiple battery cells 12 with positive and negative electrical terminals 14a, 14b (generally referred to as "terminal 14"). The terminals 14 of the various cells 12 are electrically and mechanically connected to one another with bus bar assemblies 16 in a configuration that provides sufficient power for large electrical loads, such as automotive hybrid propulsion systems.

Figure 2A:
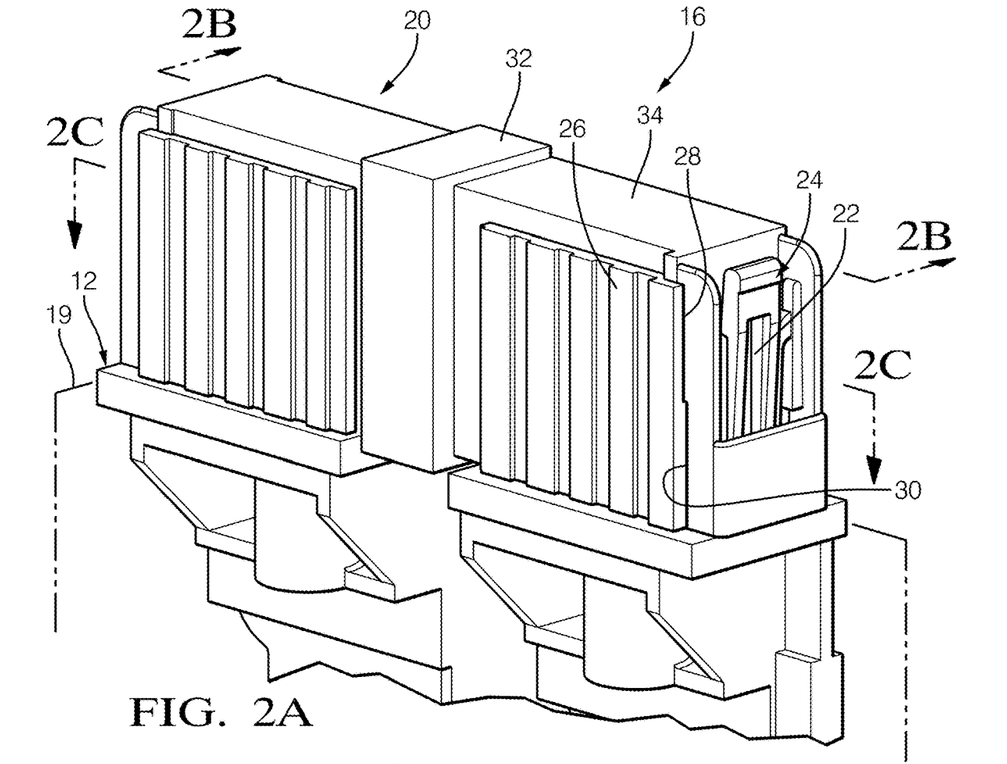
FIG. 2A is a perspective view of a first bus bar assembly secured to terminals of the battery module.
Figure 2B:
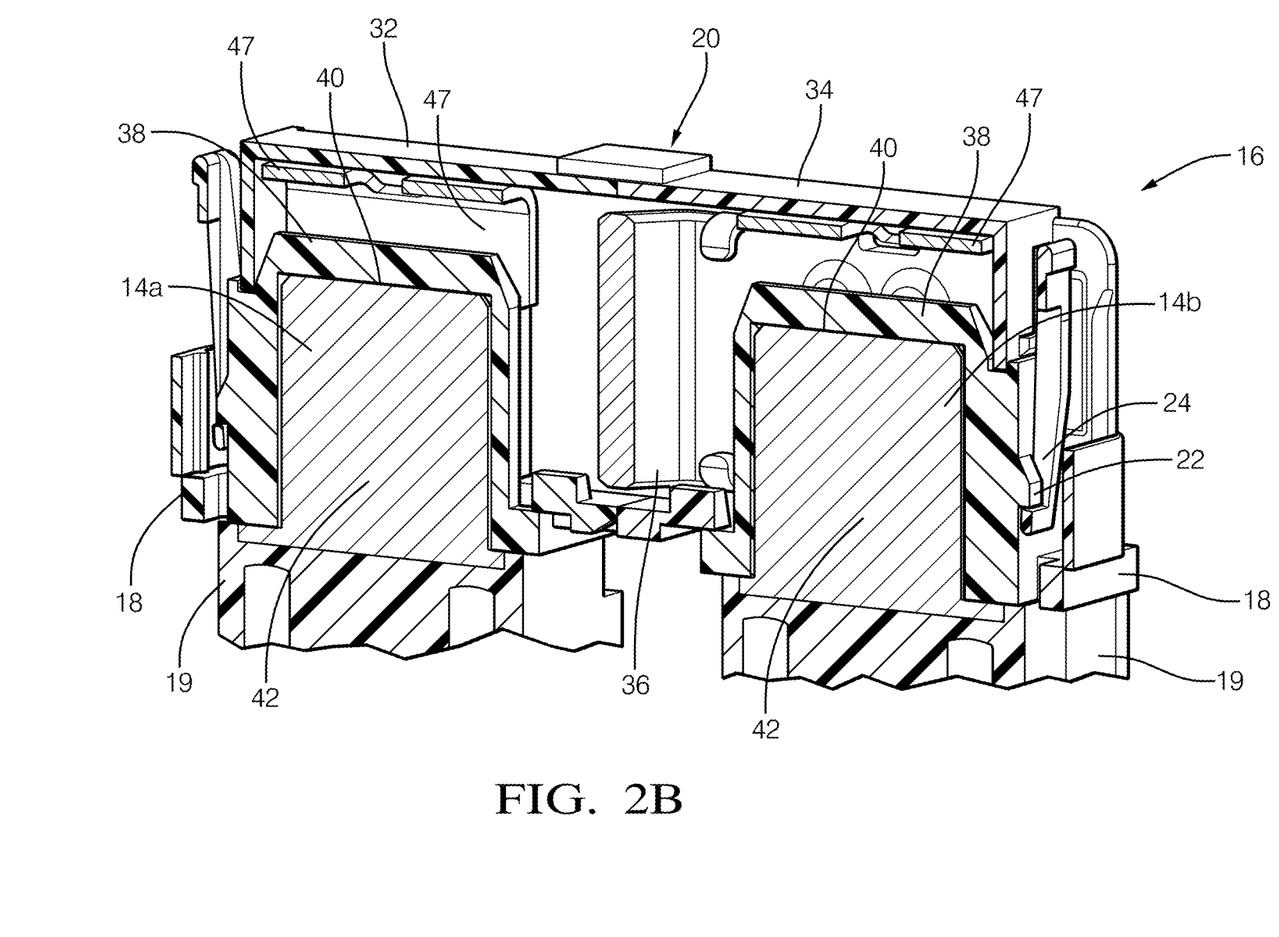
FIG. 2B is a cross-sectional view of the first bus bar assembly taken along line 2B-2B in FIG. 2A.
Figure 3A:
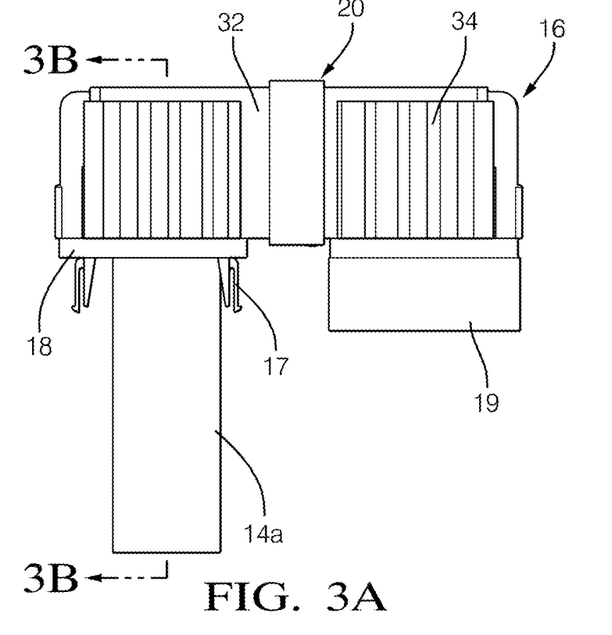
FIG. 3A is a side view of the first bus bar assembly shown in FIG. 2A.
Figure 3B:
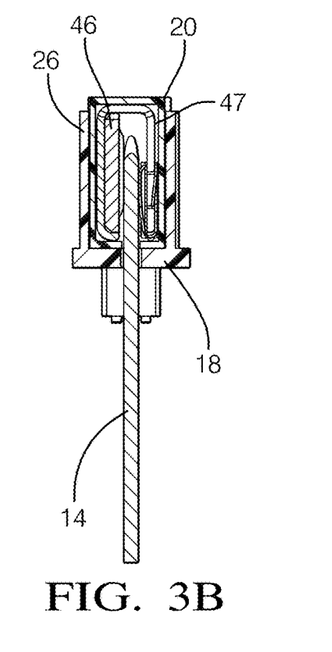
FIG. 3B is a cross-sectional view of the first bus bar assembly taken along line 3B-3B in FIG. 3A.

Referring to FIGS. 2B, 3A and 3B, the terminal 14 is provided by male terminal provided by a quadrangular copper plate. It should be understood that the terminal 14 may be configured differently, for example, as a female terminal. There is a potential shock hazard when the terminal 14 is left exposed. To mitigate the shock hazard when connecting and disconnecting the bus bar assembly 16 from the cells 12, a nonconductive terminal cap 18 is secured to a battery housing 19 by a connection 17 (FIG. 4), for example, snaps. The terminal cap 18 may also be integrally formed with the battery housing 19, for example, during a plastic molding process.

Figure 2C:
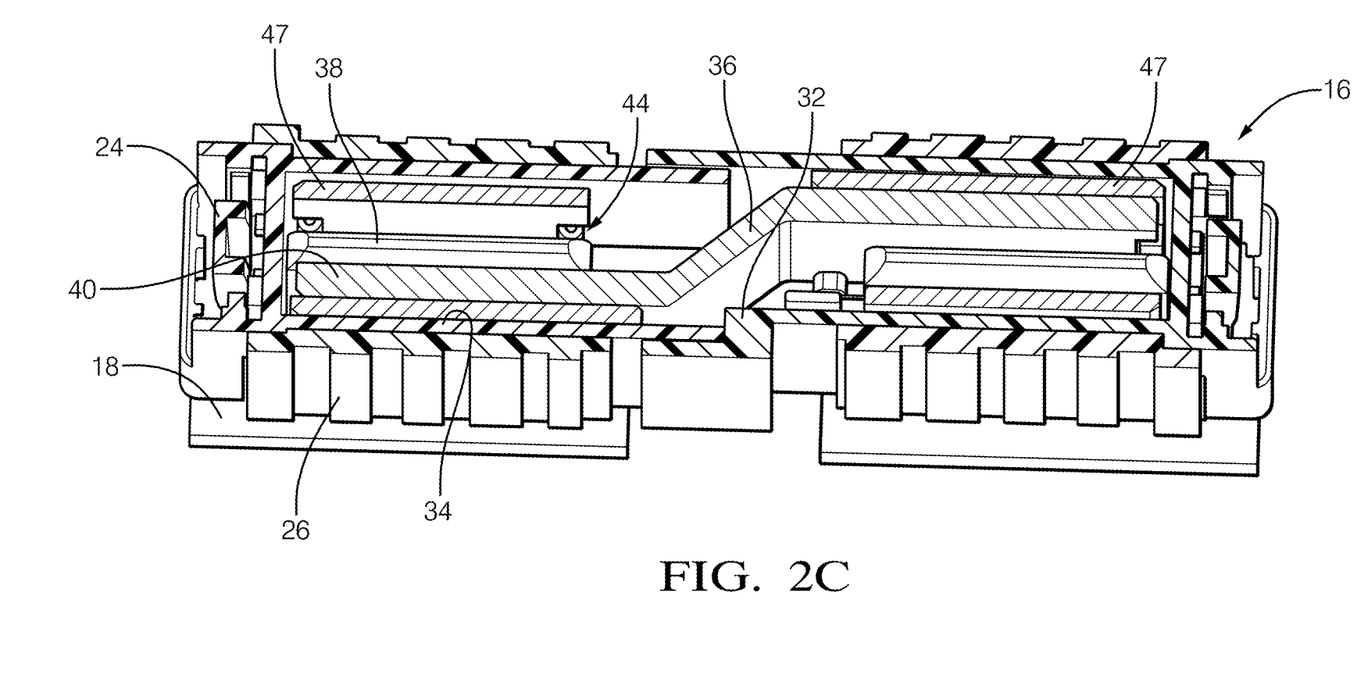
FIG. 2C is a cross-sectional view of the first bus bar assembly taken along line 2C-2C in FIG. 2A.
Figure 4:
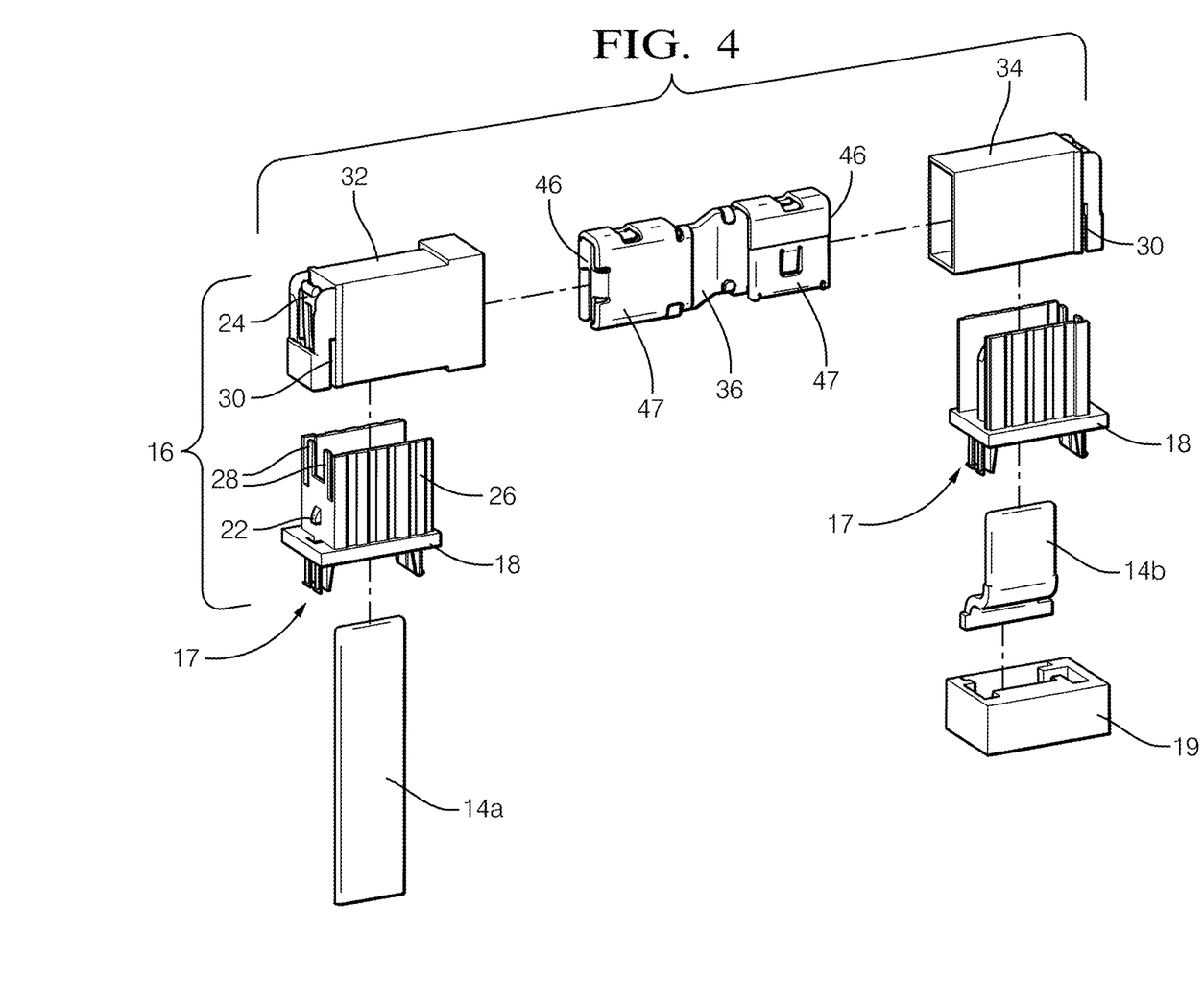
FIG. 4 is an exploded perspective view of the first bus bar assembly in an unassembled condition with respect to a terminal.

As shown in FIGS. 2-4, the bus bar assembly 16 includes a bus bar 36 (FIGS. 2B, 2C and 4) substantially enclosed by a nonconductive shroud 20. The bus bar 36 has an end 46 provided with a female terminal 47 that mechanically and electrically engages and mates with the male terminal 14 in an assembled condition.

The nonconductive terminal cap 18 at least partially surrounds the terminal 14. In the example, a U-shaped perimeter wall 26 circumscribes at least a portion of the terminal 14, for example, on three sides, to provide a gap 44 configured to expose the terminal 14 in order to receive the end 46 with the female terminal 47.

The terminal cap 18 also has a post 38 that receives the terminal 14 and is arranged interiorly of the perimeter wall 26. The terminal 14 has a perimeter edge 40 bounding opposing faces 42 of the terminal 14. The post 38 extends outward from a base of the terminal cap 18 and provides an E-shaped configuration with the perimeter wall 26. In the example, the post 38 surrounds the perimeter edge 40 but leaves at least one of the faces 42 exposed. In this manner, the post 38 shields at least the end of the terminal 14 from contact. The perimeter wall 26 extends beyond the terminal 14 and beyond the post 38 to further isolate the terminal 14. The perimeter wall 26 and the post 38 cooperate to provide the gap 44 as "finger-proof," that is, preventing undesired contact with the terminal by a technician.

In this disclosure, "finger-proof" means a configuration that meets the standard set forth in IEC 60529 entitled "Degrees of Protection Provided by Enclosures" and code IP2XB relating to finger Ingress Protection. The "test finger" is based upon a solid object 12.5 mm in diameter or more and up to 80 mm long being prevented from entering an enclosure. Furthermore, if a standard test finger 80 mm long and 12 mm in diameter enters the enclosure there will be adequate clearance from live parts, i.e., the terminal. In this manner, the disclosed finger-proof terminal cap 18 prevents a technician from inadvertently touching the terminal 14 with the terminal cap 18 in place, for example, during assembly and/or removal of the bus bar assembly 16 with respect to the cells 12.

The terminal cap 18 includes a first notch 28, and the shroud 20 includes a second notch 30. The shroud 20 is retained to the terminal cap 18 in the assembled condition by a retention feature. In the example, a first attachment feature 22 on the terminal cap 18, such as a protrusion cooperates with a finger-like second attachment feature 24 on the shroud 20, as best shown in FIG. 2B. As the shroud 20 and the female terminal 47 are pushed into the gap 44 during assembly, the first and second notches 28, 30 become nested with one another to enclose the terminal 14 and the end 46 with the female terminal 47 and the finger begins to deflect outward as the finger slides over the protrusion.

Once the shroud 20 is fully seated with respect to the terminal cap 18, the second attachment feature 24 removably engages and interlocks with the first attachment feature 22. Engagement of the first and second attachment features 22, 24 signifies that the desired mechanical and electrical engagement between the terminal 14 and the end 46 with the female terminal 47 has been achieved, that is, the end 46 has engaged the face 42 of the male terminal 14 and are safely enclosed. Once coupled, the retention feature prevents inadvertent decoupling of the bus bar 36 from the terminal 14 until the fingers and depressed and the bus bar assembly 16 is pulled away from the terminal cap 18.

In the example, the shroud 20 includes multiple shroud portions cooperating with one another to enclose the bus bar 36, which enables the bus bar to be serviced and the shroud to be reused. Referring to FIGS. 2B, 2C and 4, the multiple shroud portions include first and second shroud portions 32, 34 nested relative to one another in an overlapping relationship. The first shroud portion 32 includes a sleeve providing an opening at one end that receives an end of the second shroud portion 34. Although retentions features may be used between the first and second shroud portions 32, 34, a retention feature is not necessarily needed as the shroud portions are held together by the first and second notches 28, 30 when the bus bar assembly 16 is in the assembled condition with respect to the terminal caps 18.

Figure 5A:
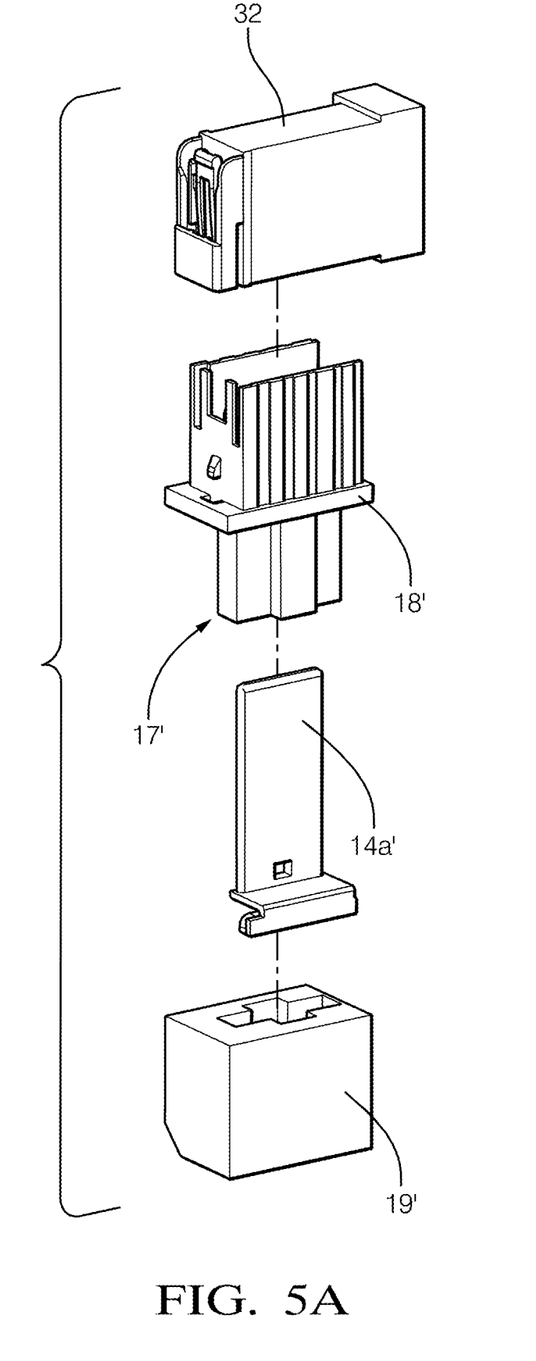
FIG. 5A is an exploded view of another terminal for use with the first bus bar assembly.
Figure 5B:
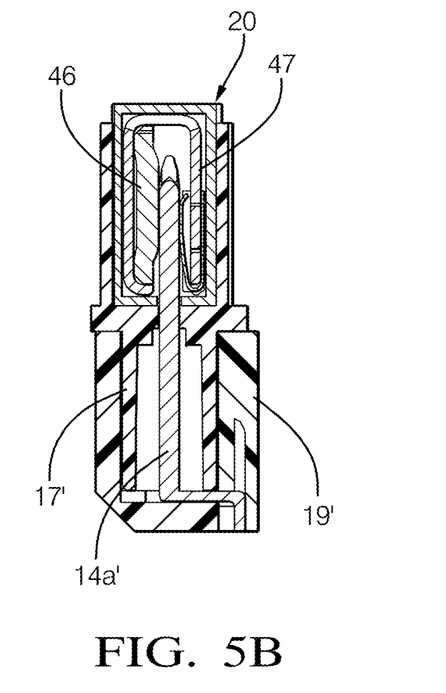
FIG. 5B is cross-sectional view of the terminal and portion of the first bus bar assembly shown in FIG. 5A.

FIGS. 5A-5B illustrate one example variation of the terminal cap 18' configuration. The configuration used in the battery module 10 may depend upon the particular connection 17' and housing 19' arrangement as well as the given terminal 14a'.

Figure 6A:
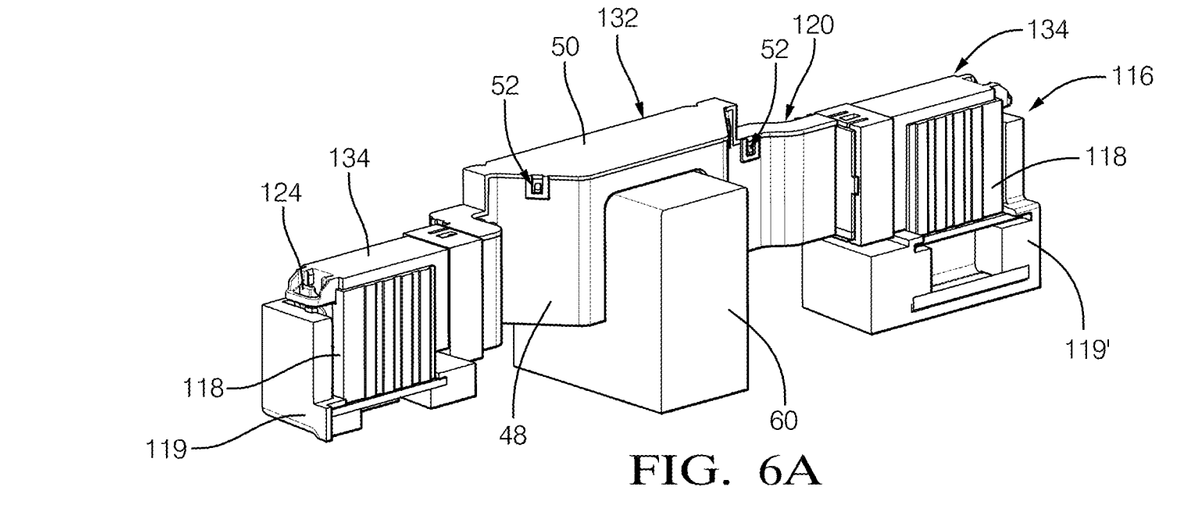
FIG. 6A is a perspective view of a second bus bar assembly.
Figure 9:
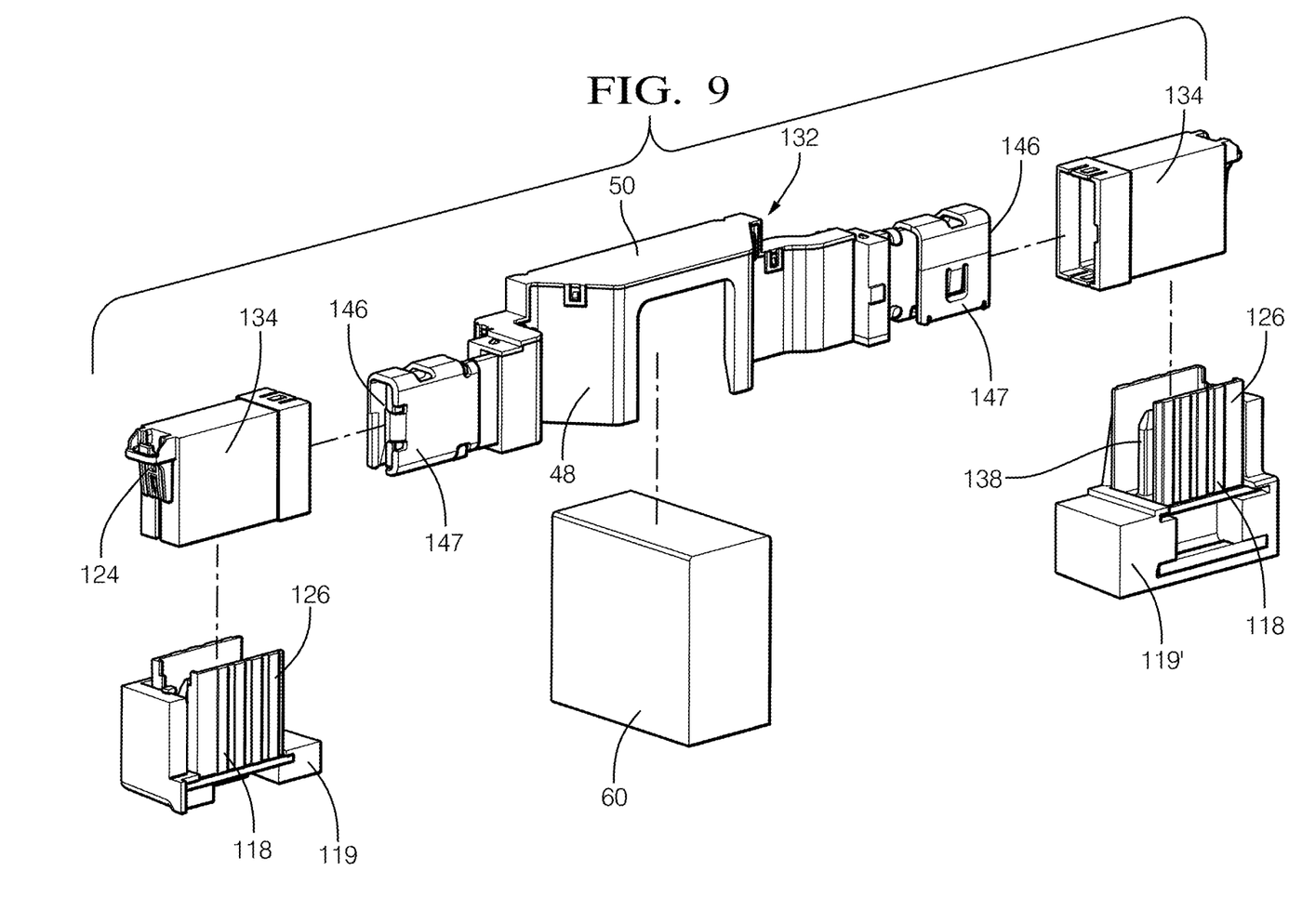
FIG. 9 is an exploded perspective view of the second bus bar assembly with the central portion of the bus bar enclosed by a portion of the shroud.

Another example bus bar assembly 116 is shown in FIGS. 6A-9. Like numerals indicate like elements. FIGS. 6A, 6B and 9 illustrate one example variation of the terminal cap 18 configuration secured using different housings 19, 19'. Similar to the first bus bar assembly 16, the nonconductive terminal cap 118 at least partially surrounds the terminal 114. There is a U-shaped perimeter wall 126 circumscribing at least a portion of the terminal 114 on three sides to provide the gap 144 exposing the terminal 114 to receive the end 147 with the female terminal 147.

Figure 6B:
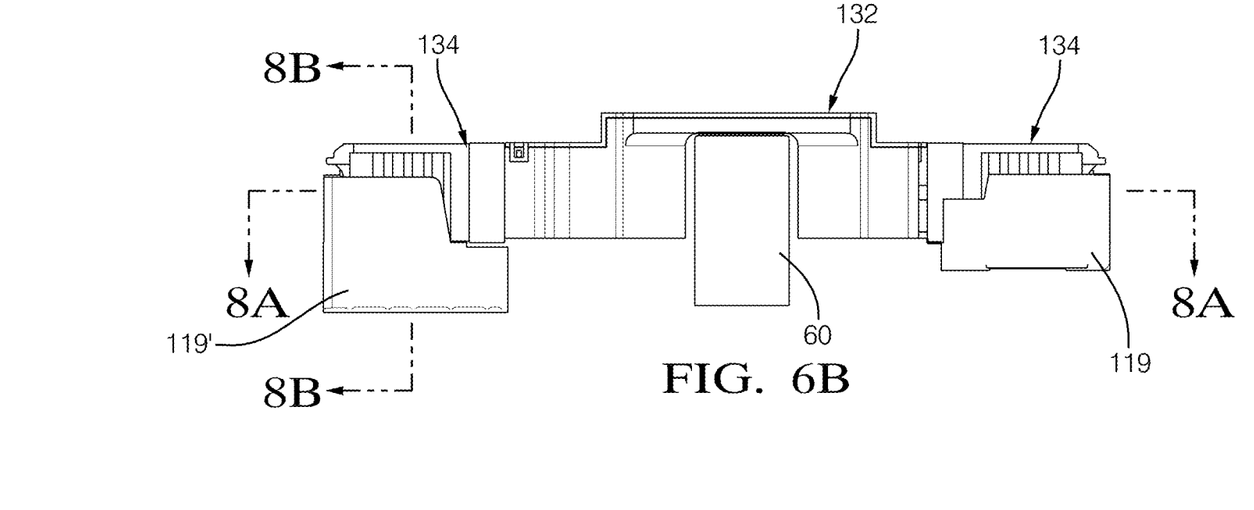
FIG. 6B is a side view of the second bus bar assembly shown in FIG. 6A.

The post 138 receives the terminal 114 interiorly of the perimeter wall 126. The post 138 shields the terminal 114 from contact in a manner similar to that described above in relation to the first bus bar assembly 16. Together the perimeter wall 26 and the post 38 cooperate to provide the gap 44 as "finger-proof," that is, preventing undesired contact with the terminal by a technician.

Rather than using notches like the first bus bar assembly 16, the second bus bar assembly 116 is received interiorly of the perimeter wall 126 instead of in overlapping relationship. The shroud 120 is retained to the terminal cap 118 in the assembled condition by a retention feature. The first attachment feature on the terminal cap is not illustrated in the Figures but is provided by a protrusion cooperates with a finger-like second attachment feature 124 on the shroud 120, as best shown in FIGS. 6A and 9. As the shroud 120 and the end 146 with the female terminal 147 are pushed into the gap 144 during assembly, the end 146 and the finger begins to deflect outward as the finger slides over the protrusion.

Once the shroud 120 is fully seated with respect to the terminal cap 118, the second attachment feature 124 removably engages and interlocks with the first attachment feature. Engagement of the first and second attachment features signifies that the desired mechanical and electrical engagement between the terminal 114 and the end 146 with the female terminal 147 has been achieved, that is, the end 146 has engaged the opposing faces 142 of the male terminal 114 and are safely enclosed. Once coupled, the retention feature prevents inadvertent decoupling of the bus bar 136 from the terminal 114 until the fingers and depressed and the bus bar assembly 116 is pulled away from the terminal cap 118.

The shroud 120 includes multiple shroud portions cooperating with one another to enclose the bus bar 136, which enables the bus bar to be serviced and the shroud to be reused. The multiple shroud portions include first and second shroud portions 132, 134 nested relative to one another in an overlapping relationship. In this example, the second shroud portion 134 is provided on each of opposing sides of the central first shroud portion 132. The first shroud portion 132 is provided by cover 50 snap-fit to a base 48. The first shroud portion 132 includes a sleeve providing an opening at one end that receives a respective end of the second shroud portion 134 using a snap-fit 52 when in the assembled condition. Snap-fits, which include a mating window 54 and a protrusion 56, are used to connect the various shroud pieces.

Figure 7A:
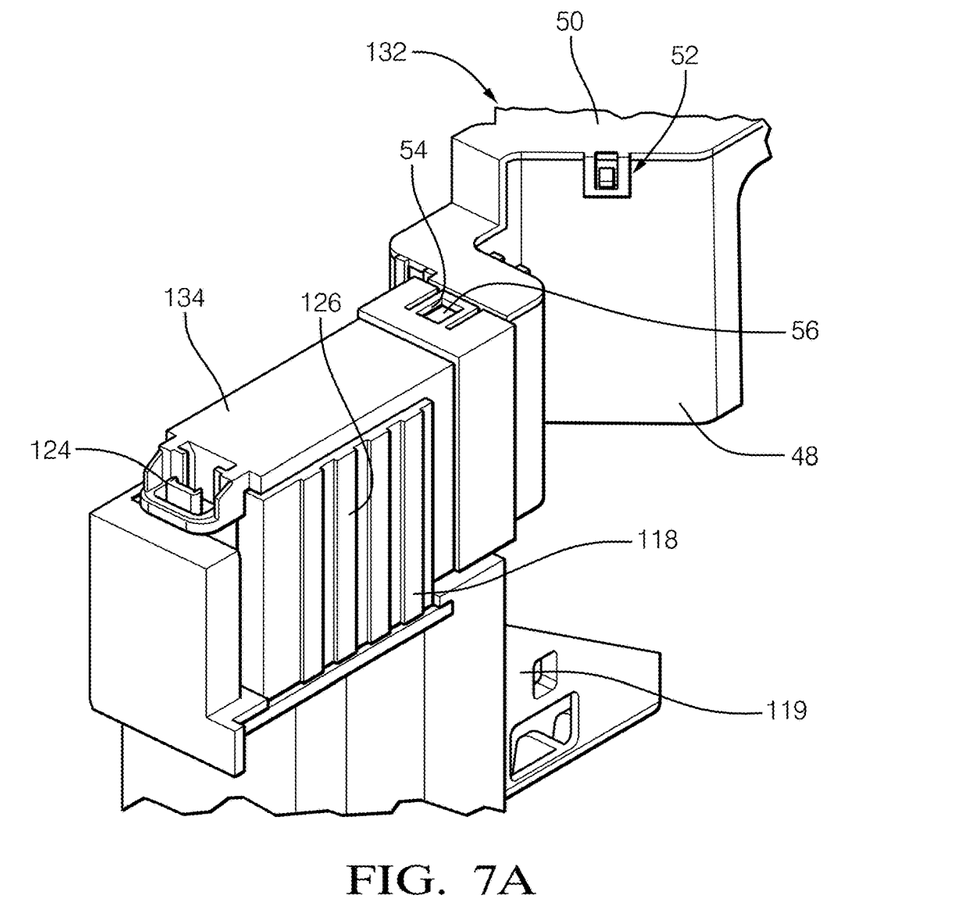
FIG. 7A is an enlarged perspective view of a portion of the second bus bar assembly shown in FIG. 6A.
Figure 7B:
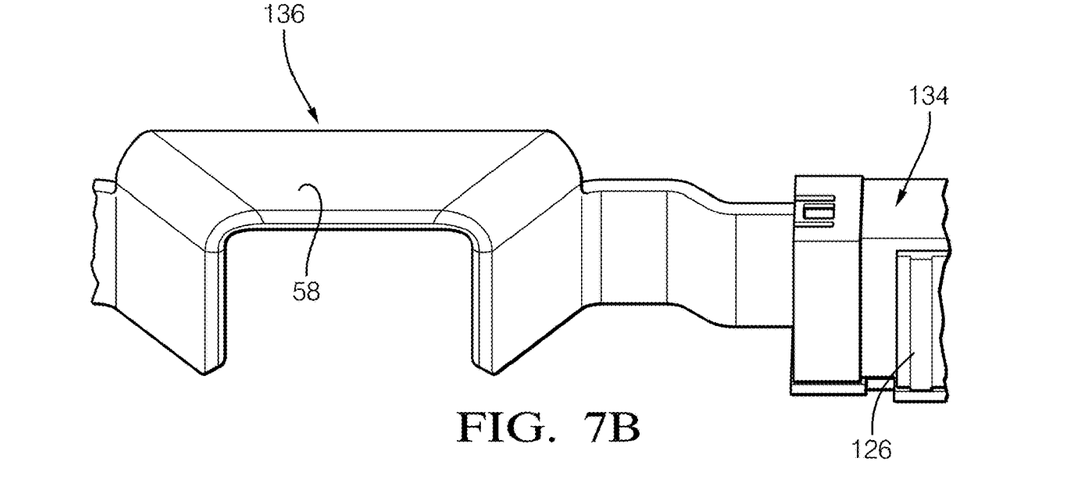
FIG. 7B is a partial perspective side view of the second bus bar assembly with a central shroud portion removed to illustrate the bus bar shape.
Figure 8A:
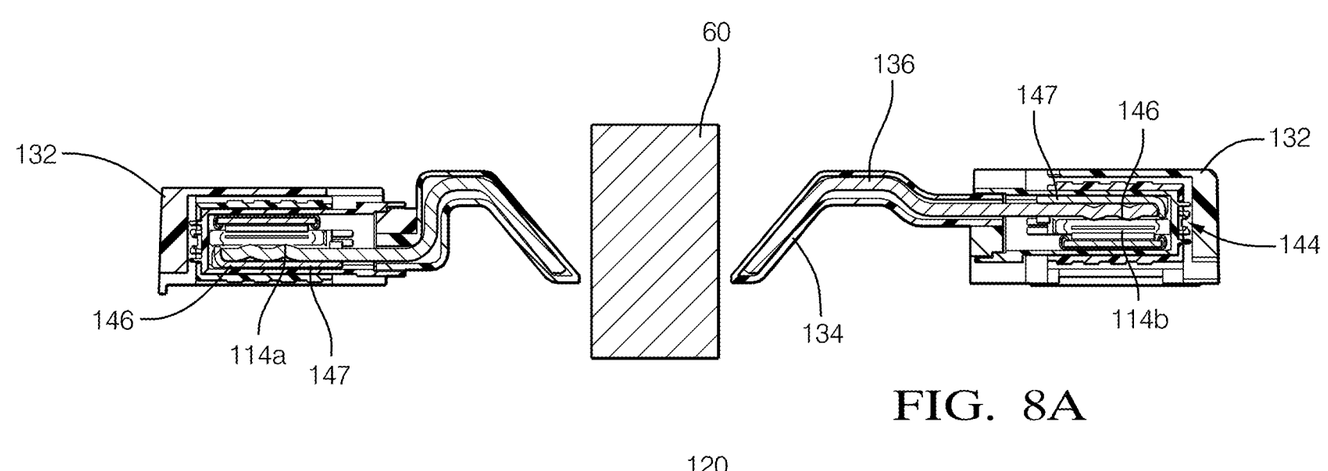
FIG. 8A is a cross-sectional view of the second bus bar assembly taken along line 8A-8A in FIG. 6B.
Figure 8B:
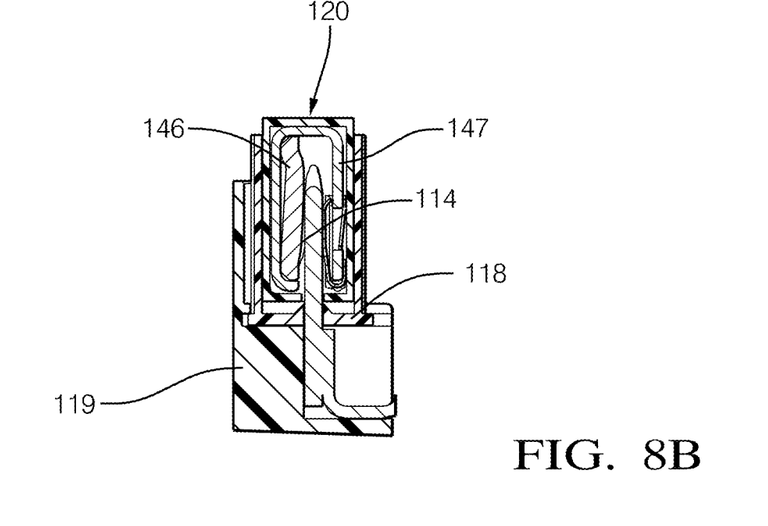
FIG. 8B is cross-sectional view of the second bus bar assembly taken along line 8B-8B in FIG. 6B.

The bus bar 136 includes a U-shaped portion 58 received in the first shroud portion 132 to provide a space between opposing ends 46 of the bus bar 136. The space accommodates an obstruction 60 arranged between the terminals 14 to enable compact packaging of the battery module 10 with respect to other components.

In operation, during assembly of the battery module 10, a nonconductive terminal cap 18 is provided over a conductive battery cell terminal 14. The terminal caps 18 may be provided as loose pieces that are secured to the battery housing 19, if desired, or they may be integrated into the housing. The terminal cap 18 at least partially surrounds the terminal 14, which is a male terminal. The terminal cap 18 has a perimeter wall 26 configured to circumscribe at least a portion of the terminal 14. The terminal 14 is arranged in a post 38 that shields the terminal 14. The perimeter wall 26 and the post 38 cooperate to provide a finger-proof gap 44 that exposes the terminal 14.

A bus bar assembly 16 is provided with a bus bar 36 having an end 46, which is a female terminal. A nonconductive shroud 20 encloses the bus bar 36 with the end 46 exposed through the shroud 20. The end 46 of the bus bar assembly 16 is pushed into the gap 44 and into engagement with the terminal 14 so that the shroud 20 mates to the terminal cap 18 to enclose the end 46. During mating, a first attachment feature 22 on the terminal cap 18 interlocks with a second attachment feature 24 on the shroud 20.

In this manner, the terminal cap can be secured battery cell about the terminal, rendering the terminal finger-safe. Thus, the battery module is finger-proof even with the bus bar assemblies disconnected, which allows for safe assembly and handling of the battery module during assembly and servicing of the battery module.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A battery module, comprising:
    a first battery cell having an electrically conductive first male terminal;
    a second battery cell having an electrically conductive second male terminal;
    nonconductive first and second terminal caps configured to at least partially surround the first and second male terminals, the first and second terminal cap each having a perimeter wall configured to circumscribe at least a portion of the first and second male terminals to provide a gap exposing the first and second male terminals, the first and second terminal cap each include a first attachment feature;
    a bus bar having a first female terminal arranged on a first end of the bus bar and a second female terminal arranged at a second end of the bus bar, wherein the first female terminal encloses three sides of the first end and the second female terminal encloses three sides of the second end, wherein the first and second female terminals receive the first and second male terminals through openings proximate a fourth side of the first and seconds ends, respectively, when in an assembled condition, wherein the first end is laterally offset from the second end such that the first end of the bus bar is in direct contact with one side of the first male terminal and the second end of the bus bar is in direct contact with an opposite side of the second male terminal; and
    a nonconductive shroud enclosing the bus bar, wherein the shroud includes second attachment features removably engaging the first attachment feature of the first and second terminal caps in the assembled condition to secure the shroud to the first and second terminal caps.

2. The battery module of claim 1, wherein the first and second terminal caps each have a post arranged interiorly of the perimeter wall, wherein the first and second male terminals terminal each have a perimeter edge bounding opposing faces of the first and second male terminals, and wherein the posts receive the first and second terminals and surround the perimeter edge leaving the opposing faces exposed.

3. The battery module of claim 2, wherein the perimeter wall extends beyond the post, and the posts extends beyond the first and second male terminals and wherein the perimeter wall and the post cooperating to render the gap as finger-proof per code IP2XB of International Electrotechnical Commission (IEC) Standard 60529.

4. The battery module of claim 1, wherein one of the first and second attachment features is a cantilevered beam defining a slot, and the other of the first and second attachment features is a protrusion, the protrusion interlocking within the slot in the assembled condition.

5. The battery module of claim 1, wherein the shroud includes multiple shroud portions cooperating with one another to enclose the bus bar, the multiple shroud portions include first and second shroud portions nested relative to one another in an overlapping relationship.

6. The battery module of claim 1, wherein each perimeter wall has a U-shape arranged on at least three sides of the first or second terminals.

7. The battery module of claim 1, wherein the gap in the first terminal cap and the gap in the second terminal cap are arranged on opposite sides of the first and second male terminals.

8. The battery module of claim 2, wherein the gap is provided between the post and the perimeter wall.

9. The battery module of claim 2, wherein the bus bar is in direct contact with one of the opposing faces of the first or second male terminal and the first or second female terminal is in direct contact with the opposite opposing face of the first or second male terminal.

10. The battery module of claim 1, wherein the first and second female terminals are arranged laterally offset from one another.

11. The battery module of claim 10, wherein the first and second ends of the bus bar are arranged parallel to one another.

12. The battery module of claim 11, wherein the bus bar defines two equal oblique angles between the first and second ends of the bus bars.

* * * * *